US009979937B2

(12) United States Patent
Siden et al.

(10) Patent No.: US 9,979,937 B2
(45) Date of Patent: May 22, 2018

(54) DISPLAY SYSTEM BASED ON PERSISTENCE OF VISION WITH A LINE SCREEN

(71) Applicant: LIGHTVERT LTD., London (GB)

(72) Inventors: Daniel Siden, London (GB); Christophe Levine, Halse Brackley (GB)

(73) Assignee: LIGHTVERT, LTD., London (GB)

( * ) Notice: Subject to any disclaimer, the term of this patent is extended or adjusted under 35 U.S.C. 154(b) by 0 days. days.

(21) Appl. No.: 14/772,957

(22) PCT Filed: Mar. 6, 2014

(86) PCT No.: PCT/EP2014/054335
§ 371 (c)(1),
(2) Date: Sep. 4, 2015

(87) PCT Pub. No.: WO2014/135634
PCT Pub. Date: Sep. 12, 2014

(65) Prior Publication Data
US 2016/0021347 A1 Jan. 21, 2016

(30) Foreign Application Priority Data
Mar. 6, 2013 (EP) ..................... 13157933

(51) Int. Cl.
H04N 9/31 (2006.01)
G02B 5/09 (2006.01)
(Continued)

(52) U.S. Cl.
CPC ............. *H04N 9/3138* (2013.01); *G02B 5/09* (2013.01); *G02B 5/10* (2013.01); *G03B 21/204* (2013.01);
(Continued)

(58) Field of Classification Search
CPC ...... G09F 13/14; G09F 13/142; G09F 13/145; G09F 13/147; G09F 19/16; G09F 19/22;
(Continued)

(56) References Cited

U.S. PATENT DOCUMENTS

2005/0104738 A1 5/2005 Todorov
2005/0180007 A1 8/2005 Cossairt et al.
(Continued)

FOREIGN PATENT DOCUMENTS

FR 2850173 A1 4/2004
WO 03014926 A1 2/2003

*Primary Examiner* — Christina Riddle
*Assistant Examiner* — Christopher Lamb, II
(74) *Attorney, Agent, or Firm* — Arent Fox LLP; Michael Fainberg

(57) ABSTRACT

A display system for displaying an image is disclosed. The system comprises a projector comprising at least one collimated light source and a controller for receiving image data and controlling the light source, configured such that, in use, an array of columns of image data representing an image are projected sequentially onto a reflector. Due to persistence of vision they appear superimposed on one another when reflected into the eye of an observer and such that, when the observer's eye moves in a direction perpendicular to the direction of orientation of the projected columns the observer can view the image.

7 Claims, 3 Drawing Sheets

(51) Int. Cl.
*G02B 5/10* (2006.01)
*G03B 21/28* (2006.01)
*G03B 21/20* (2006.01)
*G03B 25/02* (2006.01)
*G09F 19/18* (2006.01)
*G09F 19/14* (2006.01)

(52) U.S. Cl.
CPC ............ *G03B 21/28* (2013.01); *G03B 25/02* (2013.01); *G09F 19/14* (2013.01); *G09F 19/18* (2013.01); *H04N 9/3155* (2013.01); *H04N 9/3161* (2013.01); *H04N 9/3164* (2013.01)

(58) Field of Classification Search
CPC ................ G09F 19/226; G09F 19/228; G09F 2019/223; G03B 25/00; G03B 25/02; G03B 21/28
See application file for complete search history.

(56) References Cited

U.S. PATENT DOCUMENTS

| | | | |
|---|---|---|---|
| 2008/0276507 A1* | 11/2008 | Hines | G09F 13/14 40/541 |
| 2009/0046258 A1 | 2/2009 | Schnuckle et al. | |
| 2010/0271597 A1* | 10/2010 | Spodek | G02B 3/005 352/81 |
| 2012/0008262 A1 | 1/2012 | Kobayshi et al. | |
| 2013/0162932 A1* | 6/2013 | Han | G02B 6/0058 349/65 |
| 2014/0111732 A1* | 4/2014 | Yu | G02F 1/133504 349/58 |

\* cited by examiner

DISPLAY SYSTEM BASED ON PERSISTENCE OF VISION WITH A LINE SCREEN

FIELD OF TECHNOLOGY

The present invention relates to a display system, and more particularly to display system based on persistence of vision with a line screen.

BACKGROUND

A wide variety of display systems are well known in the art. These can range from simple billboards to more complex image projection and light emitting systems. Such display systems have a wide range of applications from the provision of simple information through to more complex image display and the provision of advertising content.

Whilst a number of display system technologies are well established and in common use, there are often drawbacks associated with them. For example, traditional billboard display systems, whilst being simple and cost effective, are not particularly distinctive. Furthermore, many display systems require large structures to support them as well as a significant amount of installation for them to operate as well as often requiring a high degree of maintenance, particularly if the information that they display is to be updated on a regular basis. This is particularly the case for display systems that are required to display images on a very large scale, such as traditional billboard or electronic display advertising that is provided on top of or on the side of buildings so that they are visible from large distances.

The present invention seeks to overcome at least some of these problems.

SUMMARY

According to the present invention there is provided a display system for displaying an image, the system comprising: a projector comprising at least one collimated light source; and a controller for receiving image data and controlling the light source, configured such that, in use, an array of columns of image data representing an image are projected sequentially onto a reflector such that, due to persistence of vision they appear superimposed on one another when reflected into the eye of an observer and such that, when an observer's eye moves in a direction perpendicular to the direction of orientation of the projected columns the observer can view the image.

With the arrangement of the present invention it is possible to display an image in a distinctive way via one or more one dimensional lines of information rather than a two dimensional pane and on a large scale without the need for high levels of maintenance or the need for complex construction of the display components. It is also simple to adapt the information and update it in a cost effective and efficient manner. Furthermore, if the display system requires a reflector, it is only necessary to provide a relatively narrow reflector, in a single line, which can be supported easily on the structure of a building or free standing structure and can be structured so as not to obstruct the view from the interior of the building or light entering thereto or creating any significant visual impact on the building exterior. Such a reflector provides the means by which only one dimensional infrastructure is required rather than a traditional two dimensional billboard, which takes up much more physical space.

The present invention may be adapted to correlate the data processing speed of the observer's eye, i.e. saccade movements, with the rate at which the observer's brain retains images, i.e. sensory memory. For example, human saccadic eye movements may occur at speeds of up to 500 degrees per second and the human brain may retain images for up to 0.25 seconds. From this information, it is possible to work out the rate at which image data should be refreshed to allow the observer to view the image, as will be described below.

When viewed by the stationary eye of the observer, the projected columns of data appear superimposed upon one another. However, due to the speed and interlacing methods with which the project data is displayed, according to a refresh rate, coupled with the persistence of vision phenomenon inherent in the nature of human vision, when an observer's eye moves in a direction perpendicular to the direction of orientation of the columns of projected data, the observer can view the complete image momentarily as an imprint in their retina. In some examples, the refresh rate of the image data may be within the frequency range of 3,000 to 10,000 columns per second. The present invention utilises hybrid technology, merging the effect of persistence of vision with an image, resulting in a highly distinctive effect for visual communication.

Although preferable, it is not essential that the display system is synchronised such that the observer always view the entire image that is being displayed. In some examples, the image being displayed may be a logo, or words, or other content that is easily recognisable. This way, the observer may not need to view the entire image to receive its meaning. However, preferably, the display system of the present invention may project the image at least two times during the sweeping movement of the human eye across the columns of data such that the observer may view the entire image. Therefore, the timing of the display of columns of data does not necessarily have to be related to the timing of the observer's eye moment in order for them to view the image.

Preferably, the refresh rate of the display system may be adjustable. Use of the present invention in large scale applications may entail circumstances whereby the observer is at a large distance away from the display system. In this situation, the frequency of the refresh rate may have a greater effect of the image produced than when the observer is closer to the display system. Therefore, the system of the present invention may be tuned to advantageously ensure that the refresh rate of the system provides the observer with the best view. The refresh rate may be calculated, for example, using software in the control electronics of the display system.

Software in the control electronics of the display system may also play a part in calculating the desired arrangement of display of the columns of data. In some examples, the columns of data may be divided into pixels of data. In this example, the software may calculate, for example, using a mathematical algorithm, the angle of projection required for each sequential pixel of data such that each pixel appears in a uniform way (e.g. size, brightness) to the observer. The software may also calculate the rate of pulsing and/or shuttering of the light source in order to co-ordinate this with a rotating scanning mirror such that the output beam of light is projected at the desired pixel location.

In some examples, the projector of the display system may project an entire column of pixels simultaneously. In other examples, the projector of the display system may project each pixel sequentially. In this case, above about 200,000 points per second may be projected in an example where the image comprises 100 by 100 pixels. A greater number of pixels may require a greater number of projected points per second. In other examples, the display system may comprise multiple projectors, in which a single, or multiple, pixel(s) may be projected at one time.

Preferably, the collimated light source may be a laser. The collimated nature of the light source, along with the characteristics of the display system only projecting a single column of data at any one time, may advantageously produce only the fraction of the light pollution of, for example, a LED billboard.

In some examples, the projector of the system may comprise a collimated electromagnetic radiation source rather than a collimated light source, and in particular, a maser or a radio laser.

Preferably, the system may further comprise the reflector. The reflector may have a curved or U-shaped, or faceted cross-section to control the reflected light and the viewing angle of the image. Preferably, the reflector may have a microscopic surface structure for systematic diffraction and/or refraction so as to control the reflected light and the viewing angle of the image. Advantageously, the image produced by the display system of the present invention may be viewed equally from an obtuse viewing angle as a perpendicular viewing angle. In comparison, this effect is not achievable by display systems such as LED displays, where the image may be obscured at extreme viewing angles.

The characteristics of the reflector, together with the collimated nature of the light source, provide that the image produced by the display system may be highly scalable in size. For example, the system of the present invention is suitable for use in large scale applications such as in the projection of images onto building or billboards or the like. The scalability of the image produced by the system of the present invention advantageously does not require additional infrastructure that is likely to be costly and susceptible to damage.

The projector of the display system may comprise plural light sources.

Preferably, the light creating the image produced by the display system may comprise a range of light wavelengths. Preferably, the image may be a moving image. This advantageously provides the means for interactivity of the display system.

BRIEF DESCRIPTION OF THE DRAWINGS

One example of the present invention will now be described with reference to the accompanying drawings, in which.

DETAILED DESCRIPTION

Figure 1:
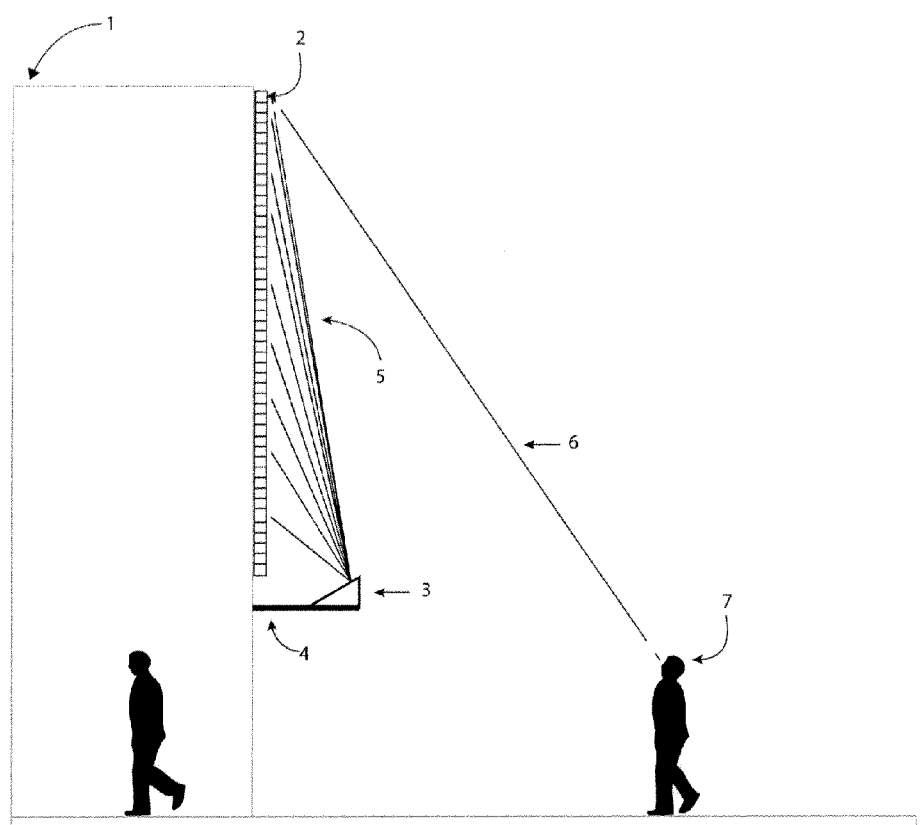
FIG. 1 is a side schematic view of a display system according to the present invention.

Referring to FIG. 1, a display system according to the present invention comprises a projector 3 and stand component 4. There is also optionally provided a reflector 2. The projector 3 comprises one or more light sources which, in use, are controlled by control electronics to project light 5 onto, in this example, a reflector 2. The reflector 2 is an elongate strip mounted on a structure 1 that can be, for example a skyscraper, bridge, tower or a free-standing structure. The reflector is preferably mounted vertically to optimise the display effect. In some circumstances the structure 1 may have a component which has reflective properties and which can be used for receipt and reflection of light 5 in place of the reflector 2.

In this example the projector light source 3 is a laser diode source capable of emitting in three colours, but could be a gas laser or other coherent or otherwise collimated light source and can be formed of multiple light sources. As an alternative to a laser light source an appropriate collimated light source such as a spotlight array, digital projector or LED array could be used.

Figure 2:
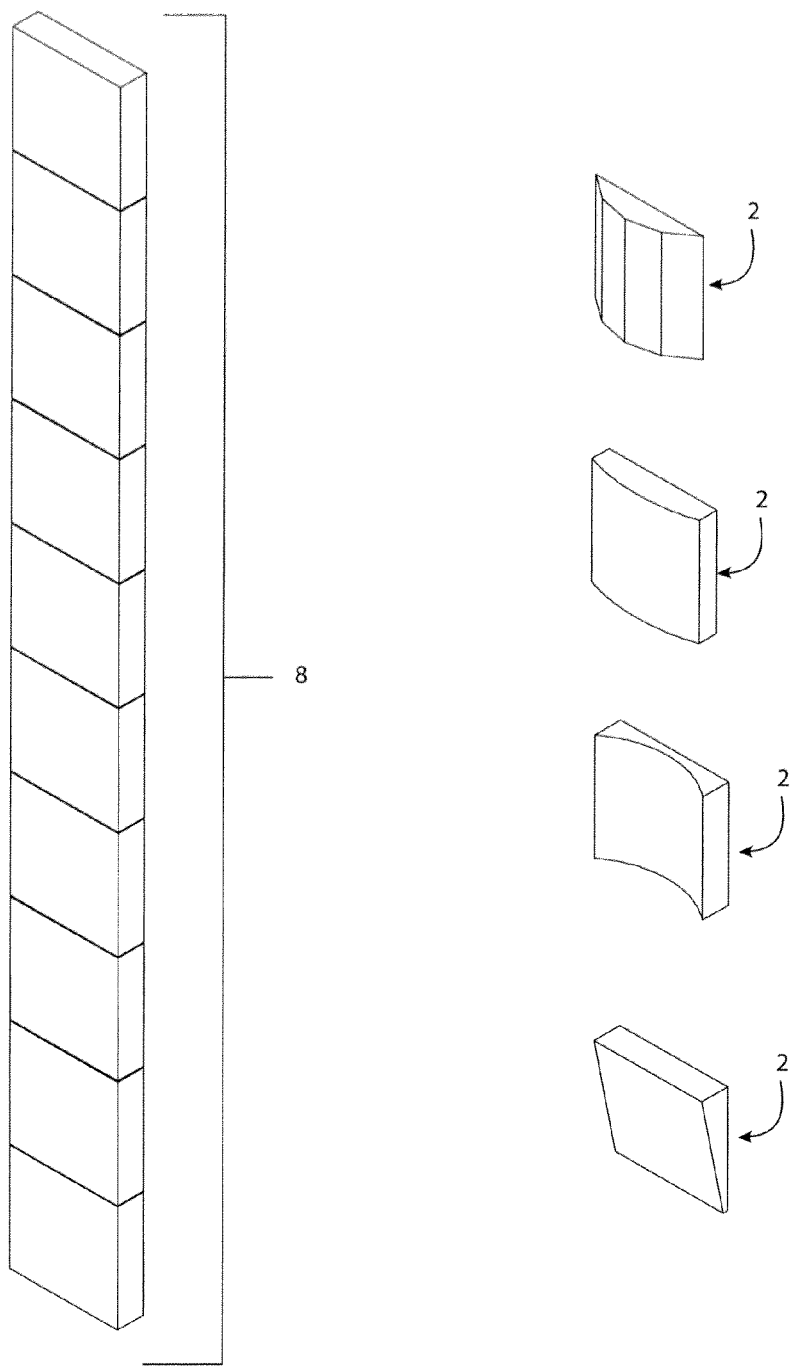
FIG. 2 is a series of views representing potential cross-sections for a reflector for use in combination with the system of the invention.

In use the projecting light source 3 is mounted by a mount 4 so that it can project light 5 onto the reflector 2 or surface of the structure 1, with the mounting either being directly on the structure, or also possibly on a structure spaced some way from the structure 1. In either case the projected light 5 is reflected 6 back towards an observer 7. As can be seen from FIG. 2, it is possible, if a reflector 2 is provided, to provide a profile for the reflector 2 that is appropriate for the designed viewing angle of the system. It can be seen that the reflector 2 is effectively a single thin strip of material, which based upon its geometric shape and/or the reflective, refractive, and diffractive material properties can serve to increase, decrease, or otherwise shape the angle of reflected light 6 serving to improve the effectiveness of the system and to perhaps prevent nuisance reflections being made into adjacent buildings or provide a reduced or increased angle of viewing of the image if that is desired.

As can be seen, the reflector may be shaped to direct the reflective light in a range of particular directions to increase the viewing angle of the reflection or to reduce it or to direct reflected light perhaps downwards or indeed, as an alternative, upwards, to be viewed. The reflector 2 may be a single continuous strip 8, or may be made up of components with different profiles to carefully select where the light is directed.

The reflector 2 may be formed from a material which has a microscopic surface structure to provide diffractive or refractive qualities and/or to improve reflection. It may also be arranged to filter the wavelengths at which light is reflected or include a fluorescent property to provide fluorescing output light to be viewed. For example, the projector may have a collimated electromagnetic radiation source such as a maser or a radio laser.

Figure 3:
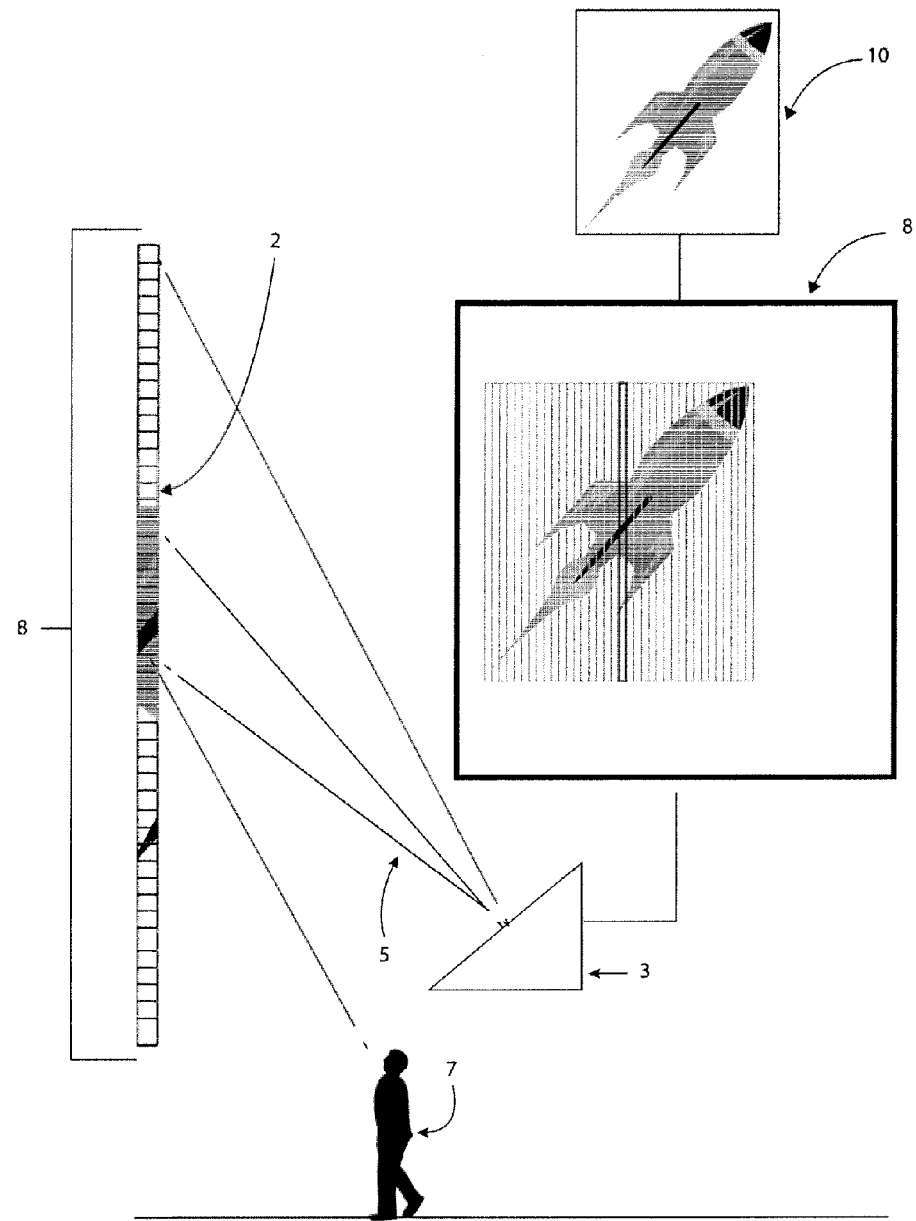
FIG. 3 is a schematic diagram showing the methodology for creating data for instruction of the projector of FIG. 1 to display an image.

Referring to FIG. 3, the manner of construction of data for control of the projector 3 by the control electronics will be explained. An image 10 is provided to the control electronics and is firstly split up into a series of X number of columns, each column having a number of pixels y. Once the image 10 is broken up into the columns it is then subdivided into pixel data relating each pixel from the top of the image to the bottom of the image. The data for each column image is then provided in succession to the control electronics which provides the data in turn to the projector 3. The light source in the projector 3 projects the light 5 of the required colour and intensity to correspond to the pixels in the column and the light directed onto the reflector 2 to a specific physical location space corresponding to the pixel allocation and the image. The information for each column in turn is then projected in sequence onto the reflector 2. The rate of projection is such that the observer's persistence of vision results in the observer viewing what seems simply to be a single strip of reflected light from the reflector 2 if there is no relative movement in the direction perpendicular to the reflector between the eyes of the observer 7 and the reflector 2. However, if there is relative movement, the observer, because of the persistence of vision effect can view all of the image as their eye scans across the reflector.

This leads to a distinctive effect in which an observer's attention is drawn to the display as what was perceived to be a continuous line of light when the observer's eyes were still is now perceived to be an image as the eyes move.

It will be appreciated that, with appropriate processing, a moving image can be projected.

It will also be appreciated that the light sources within the projector 3 and the control electronics can be constructed both for monochromatic and multi-coloured images to be provided. Where required this may be provided by a light source which is capable of emitting over a wide range of wavelengths or by multiple light sources. It is even considered possible that the light source may emit light source in a non-visible wavelength and the reflector constructed so as to provide appropriate adaptation of light received therefrom such that light viewed by the observer 7 is visible and modulated or filtered in a particular way.

The present invention therefore provides a display system which is simple to construct and install without the need for a large amount of components or additional structural features to be provided upon the building 1 onto which it projects light 5. Effectively all that is needed is, if the structure itself does not have the appropriate reflective component, a single strip of reflective material that is light and easy to install. Furthermore, with the arrangement of the present invention it is very easy to change the image that is displayed and there are a minimal number of components for maintenance. The invention also enables the provision of a distinctive and unusual image that is eye catching and then therefore of particular benefit to advertisers.

The invention claimed is:

1. A display system for displaying an image, the system comprising:

a projector comprising at least one collimated light source; and a controller configured to:
  receive image data representing an image divided into columns;
  control the at least one collimated light source; and
  sequentially project, using the projector, an array of the columns of image data onto a reflector such that one column of image data is projected onto the reflector at any one time and the columns of image data appear superimposed on one another when reflected into an eye of an observer when the eye is stationary relative to the reflector;
  wherein the projected columns of image data produce an image visible to the observer when the observer's eye scans across the reflector in a direction perpendicular to the direction of orientation of the projected columns.

2. The display system according to claim 1 further comprises the reflector which is a vertically mounted elongate strip.

3. The display system according to claim 2 wherein the reflector has a curved, U-shaped, or faceted cross-section which controls the reflection of the columns of image data and the viewing angle of the image.

4. The display system according to claim 2 wherein the reflector has a microscopic surface structure adapted to generate systematic diffraction and/or refraction, which controls the reflected light and the viewing angle of the image.

5. The display system according to claim 1 wherein the projector comprises a plurality of light sources.

6. The display system according to claim 1 wherein a light generated by the light source comprises a range of light wavelengths.

7. The display system according to claim 1 wherein the image is a moving image.

* * * * *